United States Patent Office 2,816,211
Patented Dec. 10, 1957

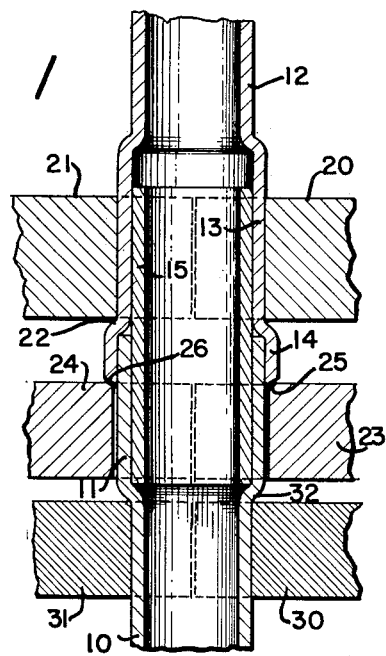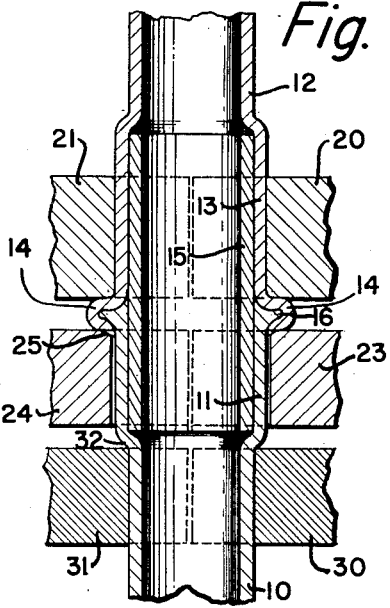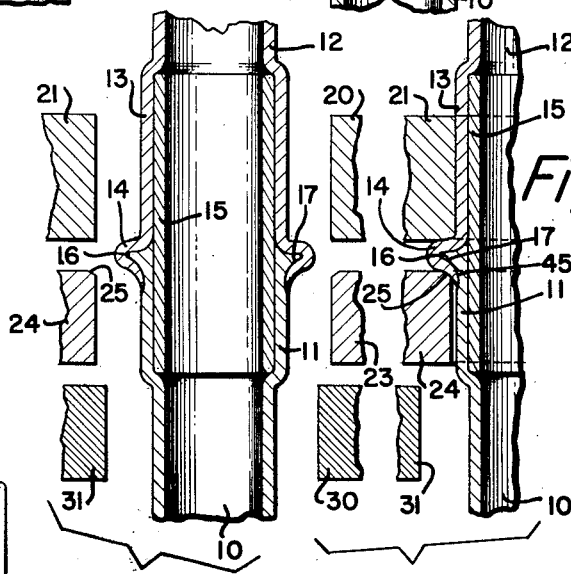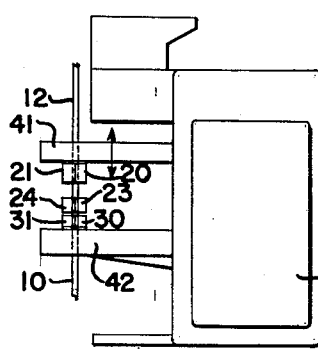
INVENTOR.
Everett C. Hutchins
His Attorney

2,816,211

REFRIGERATING APPARATUS

Everett C. Hutchins, Dayton, Ohio, assignor to General Motors Corporation, Detroit, Mich., a corporation of Delaware Application August 18, 1954, Serial No. 450,600

32 Claims. (Cl. 219—106)

This invention relates to refrigerating apparatus or the like and more particularly to the bonding of dissimilar metals, which are ordinarily difficult to bond, such as aluminum, or relatively soft tubing to copper, steel, or relatively hard tubing or to fixtures used in such apparatus.

Related subject matter is disclosed in the copending application S. N. 450,599, filed August 18, 1954, and assigned to the assignee of the present invention.

An object of this invention is to provide a method of bonding dissimilar metals, such as aluminum or relatively soft tubing to other tubing such as copper, steel or relatively hard tubing or to fixtures such as expansion valves, or the like, used in refrigerating apparatus or similar apparatus, by the use of a steel or relatively harder short tube within said tubing.

Another object of this invention is to provide a novel joint between dissimilar metals, such as aluminum or relatively soft tubing and copper, steel or relatively hard tubing or fixtures used in such apparatus, including a short steel or relatively harder tube within said tubing at said joint.

Another object of this invention is to provide an apparatus for bonding dissimilar metals, such as aluminum or relatively soft tubing to copper, steel or relatively hard tubing or to fixtures used in refrigerating apparatus or the like by the use of a short steel or relatively harder tube within such tubing.

Further objects and advantages of the present invention will be apparent from the following description, reference being had to the accompanying drawings, wherein preferred embodiments of the present invention are clearly shown.

In the drawings:

Figure 1 is a vertical cross section showing an early stage in the method of bonding the tubing.

Figures 2, 3 and 4 are figures somewhat similar to Figure 1, and showing later stages in the method.

Figure 5 is a diagrammatic representation of an apparatus for bonding the tubing.

Reference is made to aluminum, copper and steel in the following description, as illustrative and not for the purpose of limitation. Such terms are used as representative of relatively soft, relatively hard and relatively harder materials or metals.

This invention is particularly useful in the joining of aluminum and copper tubing for use in refrigerating apparatus or the like where tubing of different material or similar materials are to be joined, but is also useful in joining tubing and/or fixtures of any different metals, as will be apparent.

In practicing the method of joining tubing, one end of an aluminum or relatively soft tube 10 is formed into an aluminum bell 11 by any suitable apparatus, now well known. A copper or relatively hard tube 12 has a first copper bell 13 formed thereon near one end, which bell 13 is of substantially the same inner dimension as that of the aluminum bell 11. A second copper bell 14 is formed at the end of the first copper bell 13. The bells 13 and 14 are formed by any well known suitable apparatus. The second copper bell 14 has an inner dimension substantially the same as the outer dimension of the aluminum bell 11. If desired, the end of bell 14 is tapered at 26 by any suitable means. A short steel or relatively harder tube 15 is placed within the bells 11 and 13, and the bell 11 is telescoped into the bell 14 as shown in Figure 1. The outer dimension of tube 15 is substantially the same as the inner dimension of bells 11 and 13. Only enough clearance is provided in said dimensions to permit the indicated telescoping action. All parts of the tubes to be welded are previously cleaned by mechanical or chemical means, now well known.

Separable dies, made of mating halves, for example, surround the tubing, and are pushed towards each other to push the tubes towards each other and cause the second copper bell 14 to bulge outwardly, as shown in Figures 2, 3 and 4, to form an inner cavity 16 and cause the aluminum bell 11 to bulge outwardly near its end into said cavity 16 as indicated at 17.

A die, made of halves 20 and 21, surrounds the bell 13 somewhat loosely and engages the shoulder 22 which joins the first and second copper bells 13 and 14. A molybdenum, or similar material, die made of halves 23 and 24 surrounds the lower part of bell 11 and is circumferentially slightly spaced therefrom, to concentrate the flow of current into bell 14. The molybdenum die is provided with a tapered shoulder 25 which is adjacent to and mates the tapered end 26 of the bell 14, as indicated in Figure 1. The molybdenum die 23, 24 does not touch the aluminum tube 10 or bell 11. Another die made of halves 30 and 31 surrounds the main body of the tube 10, if desired, adjacent the shoulder 32 where the main body of tube 10 joins bell 11. The die 30, 31 tightly grasps or pushes the tube 10 so that no relative axial movement occurs between the tube 10 and the die 30, 31. Any method may be used to move the halves of the dies toward and away from each other. For example, bolts or screws, not shown, at the ends of the halves may move the halves toward and away from each other. Instead, the die halves may be moved toward and away from each other by air or hydraulically operated plungers, not shown.

The machine 40, shown in Figure 5 has an arm 41 which carries the die 20, 21. Arm 42 carries the dies 23, 24 and 30, 31. The arms 41 and 42 are moved relatively towards and away from each other, and the machine is capable of passing a heavy momentary current through the tubing, at the selected time. The machine without the dies is now well known as an air operated press welder. Any equivalent machine may be used.

The arms 41 and 42 are moved relatively towards each other, as by maintaining the arm 42 stationary and moving the arm 41 downward. A subsequent step is indicated in Figure 2 wherein the dies have approached each other sufficiently to bulge the bell 14 outwardly to form the inner cavity 16 and to cause the end of bell 11 to bulge outwardly into the cavity 16 as indicated at 17. The steel tube 15, which has substantially the same outer dimension as the inner dimension of the main parts of bells 11 and 13, prevents the inward flow of the bells, and thus insures the outward bulging action shown in Figure 2.

Upon the completion of the step indicated in Figure 2, the die halves 30 and 31 are separated, as shown in Figure 3, and the machine 40 sends a heavy momentary current through the die 23, 24, the bell 14, and die 20, 21. This current is sufficient to heat the tubing to a welding temperature, which causes the metal to flow and weld as indicated in Figure 3, the metal melted by the heat flowing downwardly and welding against the main body of the bell 11 as indicated at 45. The release of die halves 30, 31 permits the tube 10 and bell 11 to move axially the necessary amount during the weld. After the current has stopped, the pressing action is continued during the cooling period to permit the weld to freeze under pressure.

Thereafter, all the dies are separated, as shown in Figure 4, and the tubing is removed from the machine in completely joined and fluid tight condition.

Tubings 10 and 12 are shown as being of the same main inner dimension, but these tubings may be of different diameter and the bells formed thereon can then have the similar mating dimensions heretofore described.

The short steel tube 15 remains in the tubing and is in the nature of a permanent mandrel used in the bonding operation.

Either tube 10 or 12 may be a part of a fixture to be used in a refrigerating apparatus or the like, if desired.

While the forms of embodiment of the invention as herein disclosed constitute preferred forms, it is to be understood that other forms might be adopted, as may come within the scope of the claims which follow.

What is claimed is as follows:

1. The method of joining an aluminum tube having an aluminum bell to a copper tube having a first copper bell of substantially the same inner dimension as that of said aluminum bell and having a second copper bell at the end of said first copper bell which second copper bell has an inner dimension substantially the same as the outer dimension of said aluminum bell which comprises: telescoping said aluminum bell into said second copper bell with a steel tube within said bells; and pushing said tubes toward each other to cause said second copper bell to bulge outwardly to form an inner cavity and to cause said aluminum bell to bulge outwardly into said cavity while limiting inward movement by means of said steel tube.

2. The method of joining an aluminum tube having an aluminum bell to a copper tube having a first copper bell of substantially the same inner dimension as that of said aluminum bell and having a second copper bell at the end of said first copper bell which second copper bell has an inner dimension substantially the same as the outer dimension of said aluminum bell which comprises: telescoping said aluminum bell into said second copper bell with a steel tube within said bells; pushing said tubes toward each other to cause said second copper bell to bulge outwardly to form an inner cavity and to cause said aluminum bell to bulge outwardly into said cavity while limiting inward movement by means of said steel tube; and applying heat to said aluminum and copper tubes to weld adjacent surfaces of said aluminum and copper tubes together.

3. The method of joining an aluminum tube having an aluminum bell to a copper tube having a first copper bell of substantially the same inner dimension as that of said aluminum bell and having a second copper bell at the end of said first copper bell which second copper bell has an inner dimension substantially the same as the outer dimension of said aluminum bell which comprises: telescoping said aluminum bell into said second copper bell with a steel tube within said bells; pushing said tubes toward each other to cause said second copper bell to bulge outwardly to form an inner cavity and to cause said aluminum bell to bulge outwardly into said cavity while limiting inward movement by means of said steel tube; and sending an electric current through said aluminum and copper tubes sufficient to heat and weld adjacent surfaces of said aluminum and copper tubes together.

4. The method of joining together an aluminum tube and a copper tube which comprises: forming an aluminum bell at an end of said aluminum tube; forming a first copper bell near an end of said copper tube, said last bell being of the same inner dimension as said aluminum bell; forming a second copper bell at the end of said copper tube and adjacent the end of said first copper bell, said second copper bell having an an inner dimension substantially the same as the outer dimension of said aluminum bell; placing a steel tube within said aluminum bell and first copper bell, said steel tube having substantially an outer dimension substantially the same as the inner dimension of said aluminum bell and first copper bell; telescoping the end of said aluminum bell within said second copper bell; and pushing said tubes toward each other to cause said second copper bell to bulge outwardly to form an inner cavity and to cause said aluminum bell to bulge outwardly into said cavity while limiting inward movement by means of said steel tube.

5. The method of joining together an aluminum tube and a copper tube which comprises: forming an aluminum bell at an end of said aluminum tube; forming a first copper bell near the end of said copper tube, said last bell being of the same inner dimension as said aluminum bell; forming a second copper bell at the end of said copper tube and adjacent the end of said first copper bell, said second copper bell having an inner dimension substantially the same as the outer dimension of said aluminum bell; placing a steel tube within said aluminum bell and first copper bell, said steel tube having substantially an outer dimension substantially the same as the inner dimension of said aluminum bell and first copper bell; telescoping the end of said aluminum bell within said second copper bell; pushing said tubes toward each other to cause said second copper bell to bulge outwardly to form an inner cavity and to cause said aluminum bell to bulge outwardly into said cavity while limiting inward movement by means of said steel tube; and applying heat to said aluminum and copper tubes to weld adjacent surfaces of said aluminum and copper tubes together.

6. The method of joining together an aluminum tube and a copper tube which comprises: forming an aluminum bell at an end of said aluminum tube; forming a first copper bell near an end of said copper tube, said last bell being of the same inner dimension as said aluminum bell; forming a second copper bell at the end of said copper tube and adjacent the end of said first copper bell, said second copper bell having an inner dimension substantially the same as the outer dimension of said aluminum bell; placing a steel tube within said aluminum bell and first copper bell, said steel tube having substantially an outer dimension substantially the same as the inner dimension of said aluminum bell and first copper bell; telescoping the end of said aluminum bell within said second copper bell; pushing said tubes toward each other to cause said second copper bell to bulge outwardly to form an inner cavity and to cause said aluminum bell to bulge outwardly into said cavity while limiting inward movement by means of said steel tube; and sending an electric current through said aluminum and copper tubes sufficient to heat and weld adjacent surfaces of said aluminum and copper tubes together.

7. An apparatus for joining an aluminum tube having an aluminum bell to a copper tube having a first copper bell of substantially the same inner dimension as that of said aluminum bell and having a second copper bell at the end of said first copper bell which second copper bell has an inner dimension substantially the same as the outer dimension of said aluminum bell and in which said aluminum bell is telescoped in said second copper bell with a steel tube within said bells, which comprises: a die adapted to envelop said aluminum bell adjacent said second copper bell; a die adapted to envelop said first copper bell loosely adjacent said second copper bell; means to move said dies relatively toward each other to cause said second copper bell to bulge outwardly to form an inner cavity and to cause said first aluminum bell to bulge outwardly into said cavity; and means to heat said tubes to weld adjacent surfaces of said tubes.

8. An apparatus for joining an aluminum tube having an aluminum bell to a copper tube having a first copper bell of substantially the same inner dimension as that of said aluminum bell and having a second copper bell at the end of said first copper bell which second copper bell has an inner dimension substantially the same as the outer dimension of said aluminum bell and in which said aluminum bell is telescoped in said second copper bell with a steel tube within said bells, which comprises: a die adapted to envelop said aluminum bell adjacent said second copper bell; a die adapted to envelope said first copper bell loosely adjacent said second copper bell; means to move said dies relatively toward each other to cause said second copper bell to bulge outwardly to form an inner cavity and to cause said first aluminum bell to bulge outwardly into said cavity; and means for sending an electric current through said aluminum and copper tubes sufficient to heat and weld adjacent surfaces of said aluminum and copper tubes together.

9. The method of joining a relatively soft tube having a relatively soft bell to a relatively hard tube having a first relatively hard bell of substantially the same inner dimension as that of said relatively soft bell and having a second relatively hard bell at the end of said first relatively hard bell which second relatively hard bell has an inner dimension substantially the same as the outer dimension of said relatively soft bell which comprises: telescoping said relatively soft bell into said second relatively hard bell with a relatively harder tube within said bells; and pushing said tubes toward each other to cause said second relatively hard bell to bulge outwardly to form an inner cavity and to cause said relatively soft bell to bulge outwardly into said cavity.

10. A method of joining a relatively soft tube having a relatively soft bell to a relatively hard tube having a first relatively hard bell of substantially the same inner dimension as that of said relatively soft bell and having a second relatively hard bell at the end of said first relatively hard bell which second relatively hard bell has an inner dimension substantially the same as the outer dimension of said relatively soft bell which comprises: telescoping said relatively soft bell into said second relatively hard bell with a relatively harder tube within said bells; pushing said tubes toward each other to cause said second relatively hard bell to bulge outwardly to form an inner cavity and to cause said relatively soft bell to bulge outwardly into said cavity; and applying heat to said relatively hard and soft tubes to weld adjacent surfaces of said relatively hard and soft tubes together.

11. The method of joining a relatively soft tube having a relatively soft bell to a relatively hard tube having a first relatively hard bell of substantially the same inner dimension as that of said relatively soft bell and having a second relatively hard bell at the end of said first relatively hard bell which second relatively hard bell has an inner dimension substantially the same as the outer dimension of said relatively soft bell which comprises: telescoping said relatively soft bell into said second relatively hard bell with a relatively harder tube within said bells; pushing said tubes toward each other to cause said second relatively hard bell to bulge outwardly to form an inner cavity and to cause said relatively soft bell to bulge outwardly into said cavity; and sending an electric current through said relatively hard and soft tubes sufficient to heat and weld together adjacent surfaces of said relatively hard and soft tubes.

12. The method of joining together a relatively soft tube and a relatively hard tube which comprises: forming a relatively soft bell at the end end of said relatively soft tube; forming a first relatively hard bell near an end of said relatively hard tube, said last bell being of the same inner dimension as said relatively soft bell; forming a second relatively hard bell at the end of said relatively hard tube and adjacent the end of said first relatively hard bell, said second relatively hard bell having an inner dimension substantially the same as the outer dimension of said relatively soft bell; placing a relatively harder tube within said relatively soft bell and first relatively hard bell, said relatively harder tube having substantially an outer dimension substantially the same as the inner dimension of said relatively soft bell and first relatively hard bell; telescoping the end of said relatively soft bell within said second relatively hard bell; and pushing said tubes toward each other to cause said second relatively hard bell to bulge outwardly to form an inner cavity and to cause said relatively soft bell to bulge outwardly into said cavity while limiting inward movement by means of said relatively harder tube.

13. The method of joining a relatively soft tube to a relatively hard tube of substantially the same inner dimension as that of said relatively soft tube which comprises: forming a bell in an end of said relatively hard tube of substantially the same inner dimension as the outer dimension of an end of said relatively soft tube; telescoping said end of said relatively soft tube into said bell with a relatively harder tube within said bell and said end of said relatively soft tube; and pushing said tubes toward each other to cause said bell to bulge outwardly to form an inner cavity and to cause said end of said relatively soft tube to bulge into said cavity.

14. The method of joining a relatively soft tube to a relatively hard tube of substantially the same inner dimension as that of said relatively soft tube which comprises: forming a bell in an end of said relatively hard tube of substantially the same inner dimension as the outer dimension of an end of said relatively soft tube; telescoping said end of said relatively soft tube into said bell with a relatively harder tube within said bell and said end of said relatively soft tube; pushing said tubes toward each other to cause said bell to bulge outwardly to form an inner cavity and to cause said end of said relatively soft tube to bulge into said cavity; and applying heat to said bell and said end of said relatively soft tube to weld their adjacent surfaces together.

15. The method of joining a relatively soft tube to a relatively hard tube of substantially the same inner dimension as that of said relatively soft tube which comprises: forming a bell in an end of said relatively hard tube of substantially the same inner dimension as the outer dimension of an end of said relatively soft tube; telescoping said end of said relatively soft tube into said bell with a relatively harder tube within said bell and said end of said relatively soft tube; pushing said tubes toward each other to cause said bell to bulge outwardly to form an inner cavity and to cause said end of said relatively soft tube to bulge into said cavity; and sending an electric current through said bell and said end of said relatively soft tube sufficient to weld together their adjacent surfaces.

16. The method of joining together a relatively soft tube and a relatively hard tube, in which an end of said relatively hard tube has an inner dimension substantially the same as the outer dimension of an adjacent end of said relatively soft tube which comprises: telescoping said ends with a relatively harder tube within them, said relatively harder tube having substantially an outer dimension the same as the inner dimension of said end of said relatively soft tube; and pushing said tubes toward each other to cause said bell to bulge outwardly to form an inner cavity and to cause said end of said relatively soft tube to bulge outwardly into said cavity while limiting inward movement by means of said relatively harder tube.

17. The method of joining together a relatively soft tube and a relatively hard tube, in which an end of said relatively hard tube has an inner dimension substantially the same as the outer dimension of an adjacent end of said relatively soft tube which comprises: telescoping said ends with a relatively harder tube within them, said relatively harder tube having substantially an outer dimension the same as the inner dimension of said end of said relatively soft tube; pushing said tubes toward each other to cause said bell to bulge outwardly to form an inner cavity and to cause said end of said relatively soft tube to bulge outwardly into said cavity while limiting inward movement by means of said relatively harder tube and applying heat to cause a welding action at said inner cavity.

18. The method of joining an aluminum tube to a copper tube which comprises: telescoping said aluminum tube in a bell at the end of said copper tube; providing a mandrel within said tubes; and pushing said tubes towards each other to cause said bell to bulge outwardly to form an inner cavity and to cause said aluminum tube to bulge outwardly into said cavity.

19. An apparatus for joining an aluminum tube telescoped into a bell of a copper tube comprising: a die adapted to grasp said aluminum tube tightly; a die adapted to envelope said copper tube loosely adjacent said bell; a mandrel adapted to be positioned inside said tubes; and means to move said dies relatively toward each other.

20. The method of joining an aluminum tube to a copper tube having adjacent their juncture substantially the same main inner dimension as said aluminum tube which comprises: forming a bell at the end of said copper tube of substantially the same inner dimension as the outer dimension of said aluminum tube, said bell having an outer shoulder and an inner shoulder; telescoping said aluminum tube into said bell with an end of said aluminum tube abutting said inner shoulder; providing a mandrel within said tubes adjacent said bell, said mandrel being of an outer dimension substantially as large as the inner dimension of said aluminum tube; surrounding said aluminum tube in a die adjacent the end of said bell; surrounding said copper tube in another die adjacent said outer shoulder; and forcing said dies relatively toward each other to cause said bell to bulge outwardly to form an inner cavity and to cause said aluminum tube to bulge outwardly into said cavity.

21. The method of joining an aluminum tube to a copper tube having adjacent their juncture substantially the same main inner dimension as said aluminum tube which comprises: forming a bell at the end of said copper tube of substantially the same inner dimension as the outer dimension of said aluminum tube, said bell having an outer shoulder and an inner shoulder; telescoping said aluminum tube into said bell with an end of said aluminum tube abutting said inner shoulder; providing a mandrel within said tubes adjacent said bell, said mandrel being of an outer dimension substantially as large as the inner dimension of said aluminum tube; surrounding said aluminum tube in a die adjacent the end of said bell; surrounding said copper tube in another die adjacent said outer shoulder; and forcing said dies relatively toward each other to cause said bell to bulge outwardly to form an inner cavity and to cause said aluminum tube to bulge outwardly into said cavity, said tubes when joined having a substantially smooth inner jointure.

22. The method of joining an aluminum tube to a copper tube having adjacent their juncture substantially the same main inner dimension as said aluminum tube which comprises: forming a bell at the end of said copper tube of substantially the same inner dimension as the outer dimension of said aluminum tube, said bell having an outer shoulder and an inner shoulder; telescoping said aluminum tube into said bell with an end of said aluminum tube abutting said inner shoulder; providing a mandrel within said tubes adjacent said bell, said mandrel being of an outer dimension substantially as large as the inner dimension of said aluminum tube; surrounding said aluminum tube in a die adjacent the end of said bell; surrounding said copper tube in another die adjacent said outer shoulder; forcing said dies relatively toward each other to cause said bell to bulge outwardly to form an inner cavity and to cause said aluminum tube to bulge outwardly into said cavity; and applying heat to said tubes to weld adjacent surfaces of said tubes together.

23. The method of joining an aluminum tube to a copper tube having adjacent their juncture substantially the same main inner dimension as said aluminum tube which comprises: forming a bell at the end of said copper tube of substantially the same inner dimension as the outer dimension of said aluminum tube, said bell having an outer shoulder and an inner shoulder; telescoping said aluminum tube into said bell with an end of said aluminum tube abutting said inner shoulder; providing a mandrel within said tubes adjacent said bell, said mandrel being of an outer dimension substantially as large as the inner dimension of said aluminum tube; surrounding said aluminum tube in a die adjacent the end of said bell; surrounding said copper tube in another die adjacent said outer shoulder; forcing said dies relatively toward each other to cause said bell to bulge outwardly to form an inner cavity and to cause said aluminum tube to bulge outwardly into said cavity; applying heat to said tubes to weld adjacent surfaces of said tubes together; and discontinuing the application of heat while continuing to force said dies toward each other during a cooling period.

24. The method of joining an aluminum tube to a copper tube having adjacent their juncture substantially the same main inner dimension as said aluminum tube which comprises: forming a bell at the end of said copper tube of substantially the same inner dimension as the outer dimension of said aluminum tube, said bell having an outer shoulder and an inner shoulder; telescoping said aluminum tube into said bell with an end of said aluminum tube abutting said inner shoulder; providing a mandrel within said tubes adjacent said bell, said mandrel being of an outer dimension substantially as large as the inner dimension of said aluminum tube; surrounding said aluminum tube in a die adjacent the end of said bell; surrounding said copper tube in another die adjacent said outer shoulder; forcing said dies relatively toward each other to cause said bell to bulge outwardly to form an inner cavity and to cause aluminum tube to bulge outwardly into said cavity; and sending an electric current through said tubes sufficient to heat and weld adjacent surfaces of said tubes together.

25. The method of joining a relatively soft tube to a relatively hard tube which comprises: telescoping said relatively soft tube in a bell at the end of said relatively hard tube; providing a mandrel within said tubes; and pushing said tubes toward each other to cause said bell to bulge outwardly to form an inner cavity and to cause said relatively soft tube to bulge outwardly into said cavity.

26. An apparatus for joining a relatively soft tube telescoped into a bell of a relatively hard tube comprising: a die adapted to grasp said relatively soft tube lightly; a die adapted to envelop said relatively hard tube loosely adjacent said bell; a mandrel adapted to be positioned inside said tubes; and means to move said dies relatively toward each other.

27. The method of joining a relatively soft tube to a relatively hard tube having adjacent their juncture substantially the same main inner dimension as said relatively soft tube which comprises: forming a bell at the end of said relatively hard tube of substantially the same inner dimension as the outer dimension of said relatively soft tube, said bell having an outer shoulder and an inner shoulder; telescoping said relatively soft tube into said bell with an end of said relatively soft tube abutting said inner shoulder; providing a mandrel within said tubes adjacent said bell, said mandrel being of an outer dimension substantially as large as the inner dimension of said relatively soft tube; surrounding said relatively soft tube in a die adjacent the end of said bell; surrounding said relatively hard tube in another die adjacent said outer shoulder; and forcing said dies relatively toward each other to cause said bell to bulge outwardly to form an inner cavity and to cause said relatively soft tube to bulge outwardly into said cavity.

28. The method of joining a relatively soft tube to a relatively hard tube having adjacent their juncture substantially the same main inner dimension as said relatively soft tube which comprises: forming a bell at the end of said relatively hard tube of substantially the same inner dimension as the outer dimension of said relatively soft tube, said bell having an outer shoulder and an inner shoulder telescoping said relatively soft tube into said bell with an end of said relatively soft tube abutting said inner shoulder; providing a mandrel within said tubes adjacent said bell, said mandrel being of an outer dimension substantially as large as the inner dimension of said relatively soft tube; surrounding said relatively soft tube in a die adjacent the end of said bell; surrounding said relatively hard tube in another die adjacent said outer shoulder; and forcing said dies relatively toward each other to cause said bell to bulge outwardly to form an inner cavity and to cause said relatively soft tube to bulge outwardly into said cavity, said tubes when joined having a substantially smooth inner jointure.

29. The method of joining a relatively soft tube to a relatively hard tube having adjacent their juncture substantially the same main inner dimension as said relatively soft tube which comprises: forming a bell at the end of said relatively hard tube of substantially the same inner dimension as the outer dimension of said relatively soft tube, said bell having an outer shoulder and an inner shoulder; telescoping said relatively soft tube into said bell with an end of said relatively soft tube abutting said inner shoulder; providing a mandrel within said tubes adjacent said bell, said mandrel being of an outer dimension substantially as large as the inner dimension of said relatively soft tube; surrounding said relatively soft tube in a die adjacent the end of said bell; surounding said relatively hard tube in another die adjacent said outer shoulder; forcing said dies relatively toward each other to cause said bell to bulge outwardly to form an inner cavity and to cause said relatively soft tube to bulge outwardly into said cavity; and applying heat to said tubes to weld adjacent surfaces of said tubes together.

30. The method of joining a relatively soft tube to a relatively hard tube having adjacent their juncture substantially the same main inner dimension as said relatively soft tube which comprises; forming a bell at the end of said relatively hard tube of substantially the same inner dimension as the outer dimension of said relatively soft tube, said bell having an outer shoulder and an inner shoulder; telescoping said relatively soft tube into said bell with an end of said relatively soft tube abutting said inner shoulder; providing a mandrel within said tubes adjacent said bell, said mandrel being of an outer dimension substantially as large as the inner dimension of said relatively soft tube; surrounding said relatively soft tube in a die adjacent the end of said bell; surrounding said relatively hard tube in another die adjacent said outer shoulder; forcing said dies relatively toward each other to cause said bell to bulge outwardly to form an inner cavity and to cause said relatively soft tube to bulge outwardly into said cavity; applying heat to said tubes to weld adjacent surfaces of said tubes together; and discontinuing the application of heat while continuing to force said dies toward each other during a cooling period.

31. The method of joining a relatively soft tube to a relatively hard tube having adjacent their juncture substantially the same main inner dimension as said relatively soft tube which comprises: forming a bell at the end of said relatively hard tube of substantially the same inner dimension as the outer dimension of said relatively soft tube, said bell having an outer shoulder and an inner shoulder; telescoping said relatively soft tube into said bell with an end of said relatively soft tube abutting said inner shoulder; providing a mandrel within said tubes adjacent said bell, said mandrel being of an outer dimension substantially as large as the inner dimension of said relatively soft tube; surrounding said relatively soft tube in a die adjacent the end of said bell; surrounding said relatively hard tube in another die adjacent said outer shoulder; forcing said dies relatively toward each other to cause said bell to bulge outwardly to form an inner cavity and to cause said relatively soft tube to bulge outwardly into said cavity; and sending an electric current through said tubes sufficient to heat and weld adjacent surfaces of said tubes together.

32. An apparatus for joining a relatively soft tube telescoped into a bell of a relatively hard tube comprising: a die adapted to grasp said relatively soft tube lightly; a die adapted to envelop said relatively hard tube loosely adjacent said bell; a mandrel adapted to be positioned under said tubes; means to move said dies relatively toward each other; and means to heat said tubes to weld adjacent surfaces of said tubes.

References Cited in the file of this patent

UNITED STATES PATENTS

| | | |
|---|---|---|
| 376,750 | Murphy | Jan. 24, 1888 |
| 1,837,103 | Betz | Dec. 15, 1931 |
| 1,847,837 | Klopper | Mar. 1, 1932 |
| 1,971,117 | Mossberg | Aug. 21, 1934 |
| 2,290,619 | Rieger | July 21, 1942 |
| 2,356,901 | Wackman | Aug. 29, 1944 |
| 2,485,926 | Saucet | Oct. 25, 1949 |
| 2,538,882 | Schonberg | Jan. 23, 1951 |

FOREIGN PATENTS

| | | |
|---|---|---|
| 186,339 | Switzerland | Dec. 1, 1936 |
| 614,381 | Germany | June 7, 1935 |